United States Patent [19]

Inoue

[11] Patent Number: 4,755,934

[45] Date of Patent: Jul. 5, 1988

[54] SYSTEM FOR SELECTING AN ADDRESS IN AN INPUT/OUTPUT BOARD

[75] Inventor: Michiya Inoue, Hino, Japan

[73] Assignee: Fanuc Ltd., Minamitsuru, Japan

[21] Appl. No.: 804,651

[22] PCT Filed: Mar. 15, 1985

[86] PCT No.: PCT/JP85/00133

§ 371 Date: Nov. 20, 1985

§ 102(e) Date: Nov. 20, 1985

[87] PCT Pub. No.: WO85/04501

PCT Pub. Date: Oct. 10, 1985

[30] Foreign Application Priority Data

Mar. 28, 1984 [JP] Japan ............................... 59-60215

[51] Int. Cl.⁴ .................... G06F 13/00; H05K 7/02
[52] U.S. Cl. ........................................ 364/200; 361/380
[58] Field of Search ... 364/200 MS File, 900 MS File; 361/380

[56] References Cited

U.S. PATENT DOCUMENTS

| | | | |
|---|---|---|---|
| 3,942,158 | 3/1976 | Dummermuth | 364/900 |
| 4,093,998 | 6/1978 | Miller | 364/900 |
| 4,122,519 | 10/1978 | Bielawski et al. | 364/200 |
| 4,158,226 | 6/1979 | Struger et al. | 364/104 |
| 4,172,280 | 10/1979 | Spiesman | 364/900 |
| 4,172,289 | 10/1979 | Struger et al. | 364/900 |
| 4,227,247 | 10/1980 | Kintner | 364/900 |
| 4,228,495 | 10/1980 | Bernhard et al. | 364/200 |
| 4,247,882 | 1/1981 | Prager et al. | 361/380 |
| 4,281,392 | 7/1981 | Grants et al. | 364/900 |
| 4,284,362 | 8/1981 | Jackson et al. | 364/900 |
| 4,360,870 | 11/1982 | McVey | 364/200 |
| 4,373,181 | 2/1983 | Chisholm et al. | 364/200 |
| 4,428,043 | 1/1984 | Catiller et al. | 364/200 |
| 4,432,067 | 2/1984 | Nielsen | 364/900 |
| 4,517,154 | 5/1985 | Dennis et al. | 364/580 |
| 4,562,535 | 12/1985 | Vincent et al. | 364/200 |
| 4,596,014 | 6/1986 | Holeman | 371/49 |
| 4,628,437 | 12/1986 | Poschmann et al. | 364/900 |

FOREIGN PATENT DOCUMENTS 57-172430  10/1982  Japan .
57-207924  12/1982  Japan .

Primary Examiner—Gary V. Harkcom
Assistant Examiner—Randy W. Lacasse
Attorney, Agent, or Firm—Staas & Halsey

[57] ABSTRACT

An input/output board (10 to 12) address selection system selects a desired address in the pluralities of input and output boards (10 to 12) connected to a common bus (6) of an input/output interface unit (1) connected via a serial data transmission system to a main control unit (60). A programmable address translation circuit (5) is provided for deriving a slot select signal (s1 to s16) and an in-board address (BA) from an address for an input/output board accessing address which is provided from a control circuit (2) of the input/output interface unit (1). One of the input and output boards (10 to 12) is selected by the slot select signal (s1 to s16), and one of the addresses in the selected input or output board is selected by the in-board address (BA).

3 Claims, 5 Drawing Sheets

SYSTEM FOR SELECTING AN ADDRESS IN AN INPUT/OUTPUT BOARD

CROSS REFERENCE TO RELATED APPLICATION

This application is related to my copending U.S. application Ser. No. 796,021, filed Oct. 17, 1985.

BACKGROUND OF THE INVENTION

The present invention relates to an input/output board address selecting system for selecting a desired address in pluralities of input and output boards connected to a common bus of an input/output interface unit which is connected, via a serial data transmission system, with a main control unit including a microcomputer and a RAM or the like.

In numerical control equipment or similar control apparatus, output signals for controlling a machine tool or like controlled system, such as ON, OFF signals and so forth, and input signals indicating various states of the controlled system, such as ON, OFF, signals and so on, are provided via pluralities of input boards and output boards connected to a common bus of an input/output interface unit. In this instance, the destination of data transmission is specified by sending a coded address of the destination over an address line. Each board connected to the common bus monitors the state of the address line and, when the state of the address line matches its own address, recognizes that it has been selected as the destination of data transmission. Therefore, each board needs to be assigned a distinct address. On the other hand, numerical control equipment or the like may sometimes employ pluralities of input and output boards of the same kind, in which case it is necessary to hold the distinct address of each board variable. In general, this is implemented by address setting on hardware for each board. Accordingly, in the case of employing such boards, it is necessary to perform address setting for each of them although they are of the same kind, and this constitutes an obstacle to their maintenance.

SUMMARY OF THE INVENTION

An object of the present invention is to eliminate the necessity of address setting for each board, facilitating its maintenance.

According to the present invention, in the input/output board address selecting system which selects a desired address in pluralities of input and output boards connected to a common bus of an input/output interface unit which is connected via a serial data transmission system with a main control unit including a microcomputer and a RAM or the like, a programmable address translation circuit is provided which derives a slot select signal and an in-board address from an address for accessing the input or output boards which is provided from a control circuit of the input/output interface unit. One of the input and output boards is selected by the slot select signal available from the address translation circuit, and one of the addresses in the selected input or output board is selected by the in-board address from the address translation circuit.

DETAILED DESCRIPTION OF THE PREFERRED EMBODIMENTS

Figure 1:
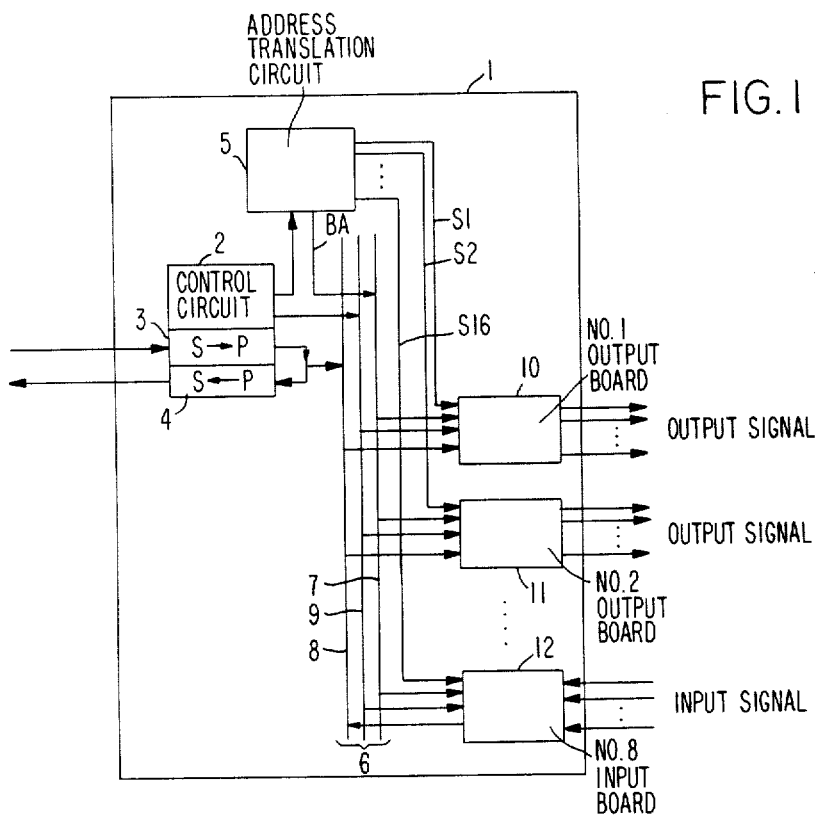
FIG. 1 is a block diagram of the principal part of an embodiment of the present invention.

In FIG. 1 which illustrates the arrangement of an input/output interface unit 1, reference numeral 2 indicates a control circuit, 3 a serial-parallel converter such as a serial-in parallel-out register or the like, 4 a parallel-serial converter such as a parallel-in serial-out register or the like, 5 an address translation circuit and 6 a common bus, which is made up of an address line 7, a data line 8 and a control line 9. Reference numeral 10 designates a No. 1 output board, 11 a No. 2 output board and 12 a No. 8 input board. The numbers of output and input boards used are both eight, and each board has a total of 32 input and output points. The control circuit 2 provides an address to the address translation circuit 5 and a read/write timing signal on the control line 9. The parallel output of the serial-parallel converter 3 is delivered on the data line 8, and the parallel-serial converter 4 has its input connected to the data line 8. The address translation circuit 5 decodes the address available from the control circuit 2 to create therefrom slot select signals s1 to s16 and an in-board address BA. The in-board address BA is provided on the address line 7 and the slot select signals s1 to s16 to the corresponding input and output boards 10 to 12. That is, the slot select signal s1 is sent to the No. 1 output board 10, the slot select signal s2 to the No. 2 output board 11, the slot select signal s16 to the No. 8 input board 12 and the slot select signals s3 to s15 (not shown) to the remaining thirteen input and output boards (not shown). The input and output boards 10 to 12 each have loaded thereon an address decoder, various gate circuits, latch circuits, input circuits, etc., as described later, and they are connected to the address line 7, the data line 8 and the control line 9, and are supplied with the slot select signals s1 to s16 via transmission lines.

Figure 2:
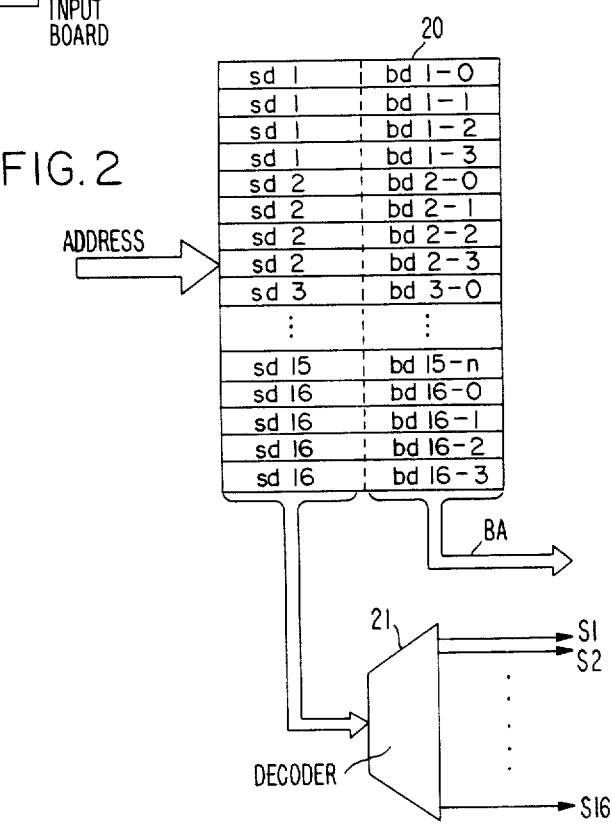
FIG. 2 is a block diagram of the principal part of an example of an address translation circuit 5.

FIG. 2 illustrates in block form the principal part of an example of the address translation circuit 5. The address of six bits from the control circuit 2 is applied to a ROM 20. The ROM 20 has a total of 64-byte storage areas which have a one-to-one correspondence to the input and output boards 10 to 12, and slot select information sd1 to sd16 are stored in four high-order bits of each byte and in-board address information bd1-0 to bd16-3 in four low-order bits. The ROM 20 outputs the stored information of the byte corresponding to the number specified by the input 6-bit address. The slot select information sd1 to sd16 are provided to a decoder 21 and the in-board address information bd1-0 to bd16-3 are provided as the in-board address BA on the address line 7. The decoder 21 decodes the slot select information sd1 to sd16 to create the abovesaid slot select signals s1 to s16. Incidentally it is also possible to increase the capacity of the ROM 20, leaving out the decoder 21. Furthermore, it will be convenient if a RAM replaces the ROM 20 and is made accessible from a microcomputer (described later), since the slot select information sd1 to sd16 and the in-board address information bd1-0 to bd16-3 can be rewritten in accordance with a modification of the system configuration.

Figure 3:
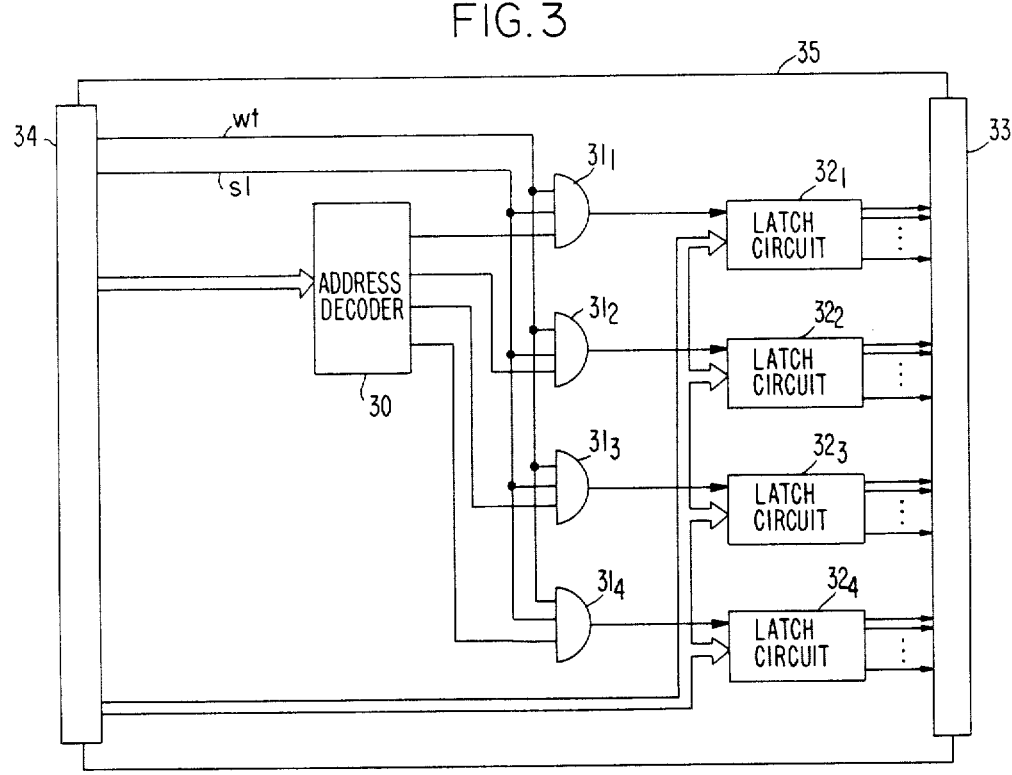
FIG. 3 is a block diagram of the principal part of an example of an output board 10.

FIG. 3 illustrates in block form an example of the output board 10. Reference numeral 30 indicates a decoder for decoding the address on the address line 7, its output being input into AND circuits $31_1$ to $31_4$. The AND circuits $31_1$ to $31_4$ are each supplied with a write timing signal wt from the control line 9 and the slot select signal s1 as well, and their outputs are provided as latch timing signals to latch circuits $32_1$ to $32_4$ respectively corresponding thereto. The latch circuits $32_1$ to $32_4$ are supplied at the input with data from the data line 8, and their output are delivered to a connector 33. When 8-bit parallel data is provided from the data line 8, the capacity of the latch circuits $32_1$ to $32_4$ is also held 8-bit, and the latched 8-bit data is extracted in parallel for output to the connector 33. A relay circuit or the like (not shown), is connected to the connector 33 to perform control corresponding to the latched contents of the latch circuits. Reference numeral 34 identifies a connector and 35 a substrate.

Figure 4:
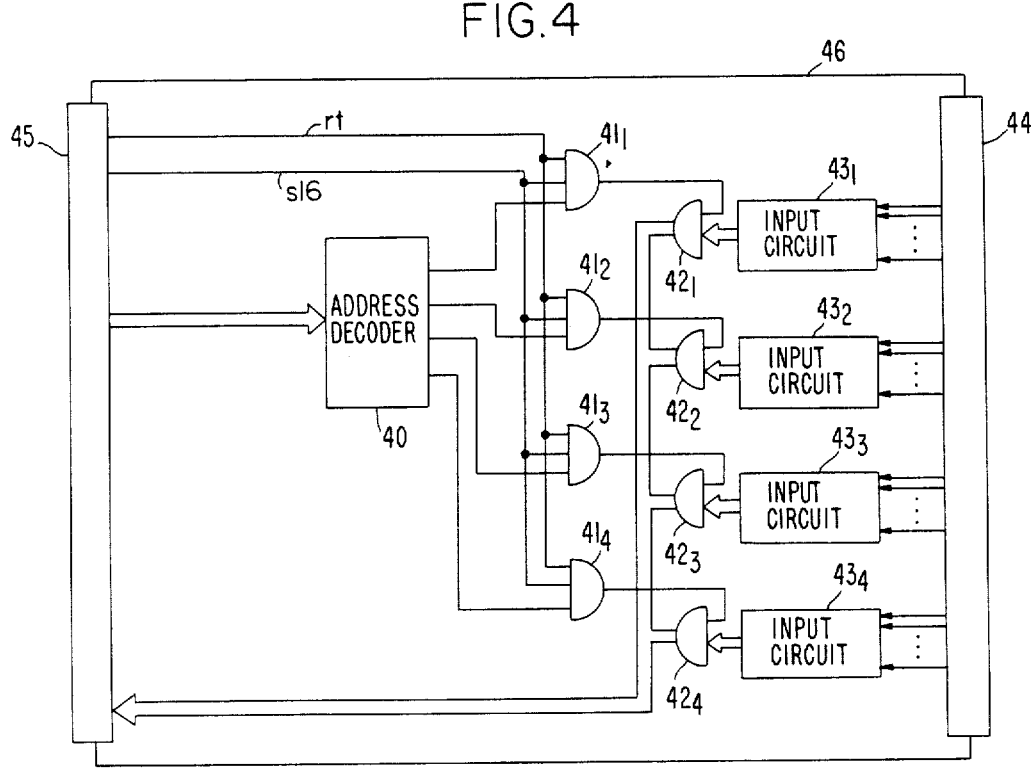
FIG. 4 is a block diagram of the principal part of an example of an input board 12.

FIG. 4 illustrates in block form the principal part of an example of the input board 12. Reference numeral 40 designates a decoder for decoding an address on the address line 7, its output being entered into AND circuits $41_1$ to $41_4$. The AND circuits $41_1$ to $41_4$ are each supplied with a read timing signal rt from the control line 9 and the slot select signal s16 as well, and their outputs are applied as gate signals to AND circuits $42_1$ to $42_4$ respectively corresponding thereto. The AND circuits $42_1$ to $42_4$ are supplied at the other input with the output of input circuits $43_1$ to $43_4$, and their outputs are delivered via a connector 45 to the data line 8. The inputs of the input circuits $43_1$ to $43_4$ are connected to a connector 44, which is supplied with contact information or the like from a controlled system, such as a machine tool or the like. Reference numeral 46 indicates a substrate.

Figure 5:
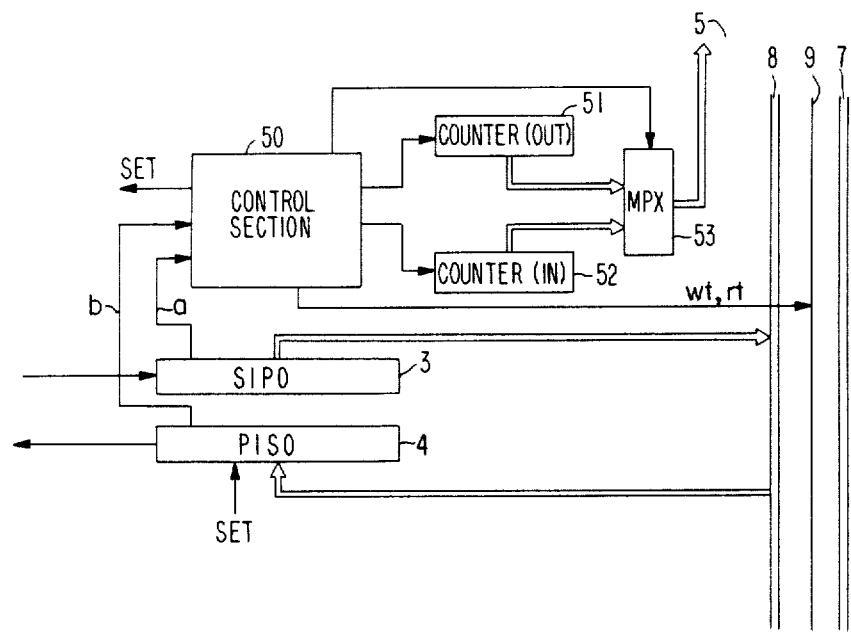
FIG. 5 is a block diagram of an example of a control circuit 2.

FIG. 5 illustrates in block form the prinicpal part of an example of the control circuit 2, in which the same reference numerals as those in FIG. 1 represents the same parts. Reference numeral 50 indicates a control section, 51 a counter for creating an address for output, 52 a counter for creating an address for input and 53 a multiplexer. The counter 51 is one that counts from 0 to 31 and then develops the count 0 as the successor to the full count, and generates an address for an output board. The counter 52 is one that counts from 32 to 63 and then develops the count 32, and generates an address for an input board. When 1-byte output data is applied via the serial data line to the serial-parallel converter 3 from a main control unit described later, the control section 50 responds to an input end signal a to increment the counter 51 by 1, switches the multiplexer 53 to the side of the counter 51 and provides the write timing signal wt on the control line 9. When receiving a serial sendout operation end signal b from the parallel-serial converter 4, the control section increments the counter 52 by 1, switches the multiplexer 53 to the side of the counter 52, provides the read timing signal rt on the control line 9 and applies a set signal SET to the parallel-serial converter 4 after a certain elapsed time. In consequence, information stored in a certain latch circuit of the input board is provided on the data line 8 at the timing of the signal rt and is set in the parallel-serial converter 4, after which the same operation as described above is repeated.

Figure 6:
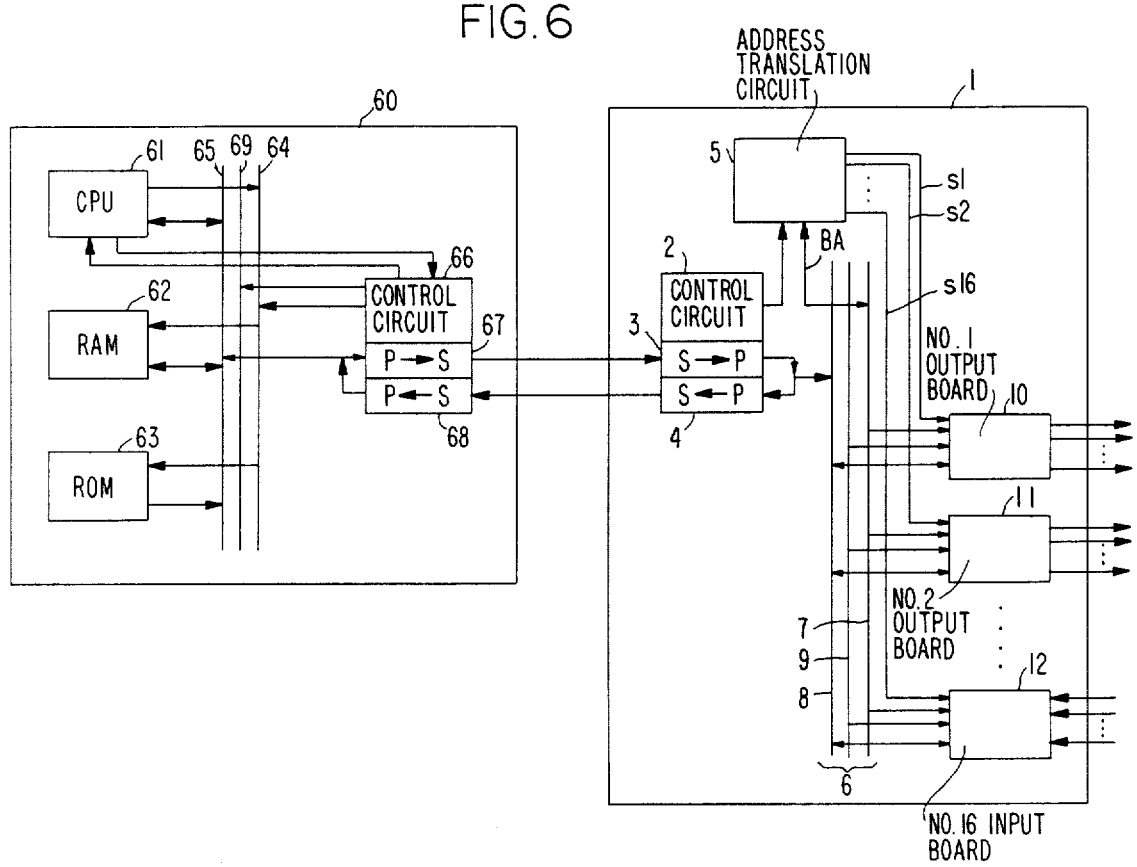
FIG. 6 is a block diagram of the general arrangement of a system embodying the address selection system of the present invention.
Figure 7:
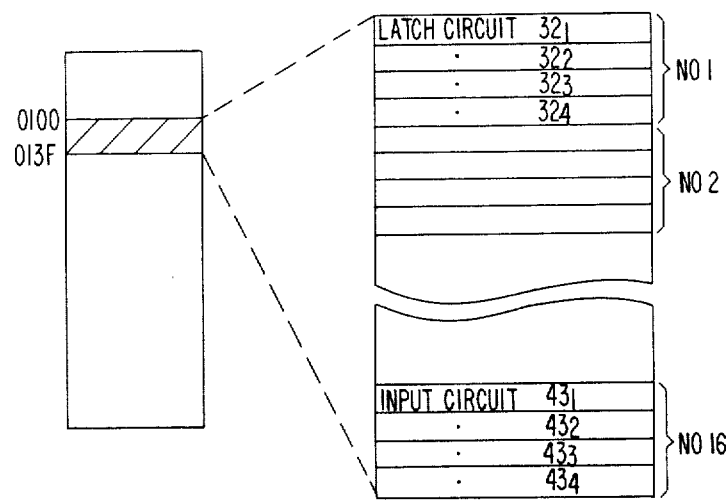
FIG. 7 is a diagram explanatory of an address space of a microprocessor.

FIG. 6 illustrates in block form the general arrangement of a system which embodies the address selection system of the present invention. The same reference numerals as those in FIG. 1 indicate the same parts. Reference numeral 60 identifies a main control unit, 61 a microcomputer, 62 a RAM, 63 a ROM, 64 an address line, 65 a data line, 66 a control circuit, 67 a parallel-serial converter, 68 a serial-parallel converter and 69 a control line. The main control unit 60 and the input-/output interface unit 1 are interconnected via a serial data transmission system. This is intended for reducing the number of connections of the whole system. I/O areas are set up in the RAM 62. For example, as depicted in FIG. 7, areas of 64 bytes from an address 0100 to 013F are used, and each byte is allocated to one of the latch circuits $32_1$ to $32_4$ and the input circuits $43_1$ to $43_4$ of the input and output boards. The microcomputer 61 processes input and output signals by accessing the I/O areas. The control circuit 66 sequentially accesses the I/O areas by the DMA method, reads out therefrom output signals for input into the parallel-serial converter 67 and stores in the I/O areas input signals converted by the serial-parallel converter 68 to parallel form.

Figure 8:
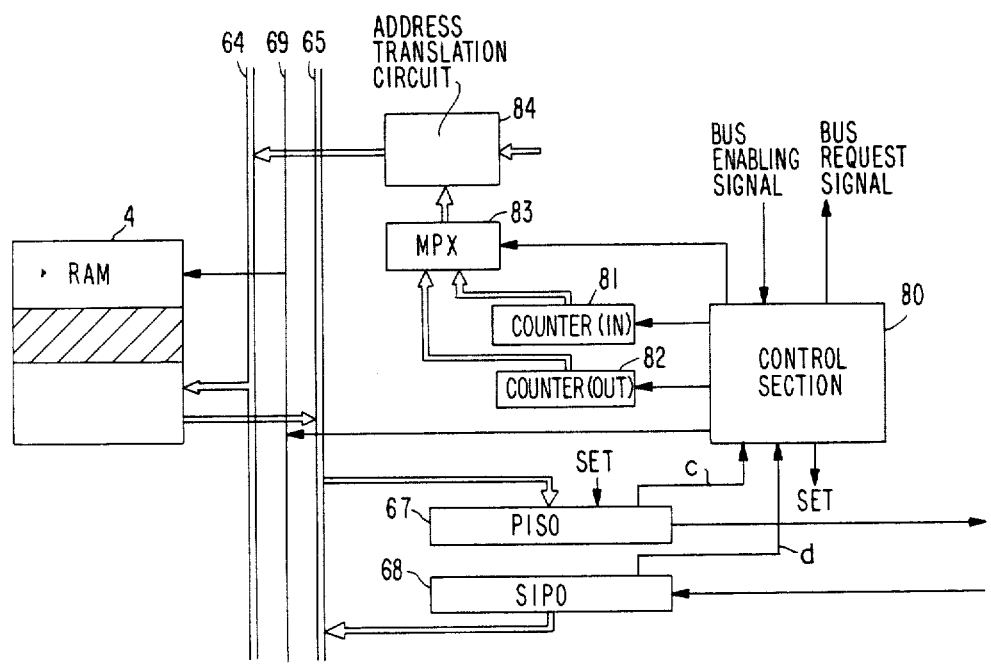
FIG. 8 is a block diagram of an example of a control circuit 66.

FIG. 8 illustrates in block form an example of the control circuit 66. Reference numeral 80 indicates a control section, 81 a counter for generating input addresses in a repeating cyclic order, 82 a counter for generating output addresses in a repeating cyclic order, 83 a multiplexer and 84 an address modification circuit for adding the leading address of the I/O area of the RAM 4 to the addresses of the counters 81 and 82. The control section 80, when supplied with a conversion end signal c from the parallel-serial converter 67, sends out a bus request signal to the microcomputer 61 and, when receiving therefrom a bus enabling signal, increments the counter 82 by 1, switches the multiplexer 83 to the side of the counter 82, provides a read signal on the control line 69 and delivers a set signal SET to the parallel-serial converter 67 after a certain elapsed time. As a result of this, information of a specified byte of the I/O area is set in the parallel-serial converter 67, wherein it is converter to serial data, which is transmitted to the input/output interface unit 1. When supplied again with the conversion end signal c from the parallel-serial converter 67, the control section repeats the above operation. Furthermore, when supplied with a setting end signal d after data setting in the serial-parallel converter 68, the control section sends out a bus request signal to the microcomputer 61 and, when receiving a bus enabling signal, increments the counter 81 by 1, switches the multiplexer 83 to the side of the counter 81 and provides a write signal on the control line 69. By this, the input signal converted by the serial-parallel converter 68 to parallel data is written into a specified byte of the I/O area.

Figure 9:
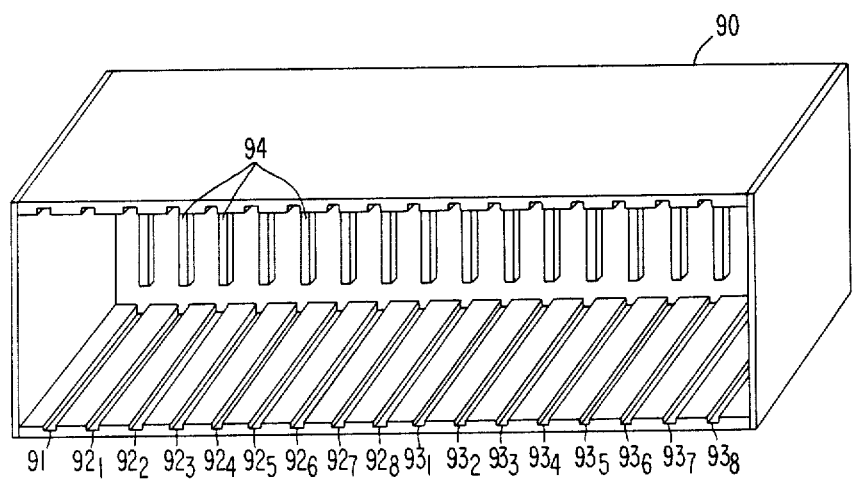
FIG. 9 is a diagram of the mechanical structure of an input/output interface unit.

FIG. 9 is a schematic diagram of the mechanical structure of the input/output interface unit 1. A back panel 90 has a slot for receiving a board which has loaded thereon the control circuit 2, the serial-parallel converter 3 and the parallel-serial converter 4, for example, eight slots $92_1$ to $92_8$ for receiving the output boards and, for instance, eight slots $93_1$ to $93_8$ for receiving the input boards. On the inside of the back panel 90 are mounted connectors 94 corresponding to the slots, respectively. The connectors 94 are to connect the common bus and transmission lines for the slot select signals s1 to s16 to the connectors 34 and 45 mounted on the boards inserted into the slots, thereby connecting the boards to the common bus and the transmission lines for the slot select signals s1 to s16. It is predetermined which of the slot select signals s1 to s16 is connected to the connectors 94. In the case where the contents of the ROM 20 of the address translation circuit 5 are predetermined, the addresses of the input and output boards are unequivocally determined according to the positions of the slots into which the boards are inserted. Accordingly, a modification of hardware on each input or output board will not necessitate address setting needed in the prior art. Therefore, for example, in the case of exchanging a certain malfunctioning input or output board, it is necessary only to pull it out of the slot and insert thereinto a new input or output board. This greatly facilitates maintenance.

While in the above embodiments four addresses are assigned to each input or output board, a desired number of addresses can be assigned. In the case of a system including input and output boards with different numbers of addresses assigned thereto, for example, several four-address input and output boards and several three-address input and output boards, the boards assigned the same number of addresses can be made identical in construction. This can easily be dealt with by rewriting the contents of the ROM 20 of the address translation circuit 5.

As has been described in the foregoing, according to the present invention, in an input/output board address selection system which selects a desired address in pluralities of input and output boards connected by a common bus of an input/output interface unit connected via a serial data transmission system with a main control unit including a microcomputer and a RAM or the like, a programmable address translation circuit is provided for creating a slot select signal and an in-board address from an address for accessing the input and output boards which is provided from a control circuit of the input/output interfact unit. One of the pluralities of input and output boards is selected by the slot select signal from the address translation circuit, and one address in the selected input or output board is selected by the in-board address provided on the common bus from the address translation circuit. Since each board can detect by the slot select signal whether it is selected or not, the in-board address which is provided on the common bus can be made to have contents overlapping between the respective input and output boards. Accordingly, decoders which are provided in the input and output boards for decoding the in-boards address can be made identical in construction. This eliminates the necessity of address setting on each input or output board which has been needed in the past, and hence facilitates maintenance of the system. Moreover, by defining the contents of translation by the address translation circuit in accordance with the system configuration, the address space of the microprocessor can effectively be utilized even in the case where input and output boards with different numbers of addresses are provided in combination.

What is claimed is:

1. An input/output board address selection system for selecting a desired address in pluralities of input and output boards connected to a common bus of an input/output interface unit which is connected via a serial data transmission system with a main control unit including a microcomputer and a RAM, comprising:
    a control circuit in the input/output interface unit, said control circuit providing an access address for accessing the input and output boards; and
    a programmable address translation circuit, coupled to the common bus and said control circuit, for creating a slot select signal and an in-board address from the access address which is provided from said control circuit of the input/output interface unit, one of the pluralities of input and output boards being selected by the slot select signal from said programmable address translation circuit, and one of the addresses in the selected input or output board being selected by the in-board address which is provided on the common bus from said programmable address translation circuit, said programmable address translation circuit including:
    a memory coupled to said control circuit, said memory including memory areas respectively corresponding to the input and output boards, each of the memory areas including slot select information and an in-board address, said memory for reading out selected slot select information and a corresponding in-board address based on the access address provided by said control circuit;
    a decoder, coupled to said memory, for receiving the selected slot select information read out from said memory and for generating the slot select signal.

2. An address selection system for selecting a desired address from among input boards and output boards coupled to a serial data transmission system, comprising:
    a common bus coupled to the input and output boards;
    a control circuit for generating an access address for accessing one of the input and output boards;
    an address translation circuit, coupled to said control circuit and said common bus, for generating a slot select signal and an in-board address based on the access address generated by said control circuit; and
    transmission lines connected to said address translation circuit and respectively connected to the input and output boards, one of the input and output boards being selected by the slot select signal generated by said address translation circuit, the slot select signal being carried on the one of said transmission lines corresponding to the selected one of the input and output boards, and one of the addresses in the selected input or putput board being selected by the in-board address which is provided on said common bus by said address translation circuit, said address translation circuit including:
    a memory coupled to said control circuit, said memory including memory areas respectively corresponding to the input and output boards, each of the memory areas including slot select information and an in-board address, said memory for reading out selected slot select information and a corresponding in-board address based on the access address provided by said control circuit;and a decoder, coupled to said memory, for receiving the selected slot select information read out from said memory and for generating the slot selects signal.

3. An address selection system according to claim 2, further comprising an input and output board mounting structure having slots formed therein for receiving the input and output boards, said input and output board mounting structure having connectors formed thereon corresponding to said slots, said connectors being connected to said common bus and being respectively connected to said transmission lines, so that each of said connectors is connected to receive a corresponding one of the slot select signals.

* * * * *

UNITED STATES PATENT AND TRADEMARK OFFICE
CERTIFICATE OF CORRECTION

PATENT NO. : 4,755,934
DATED : JULY 5, 1988
INVENTOR(S) : MICHIYA INOUE

It is certified that error appears in the above-identified patent and that said Letters Patent is hereby corrected as shown below:

Col. 1, line 22, after "OFF" delete ",".

Col. 4, line 49, "converter" should be --converted--.

Col. 5, line 45, "interfact" should be --interface--;
        line 56, "in-boards" should be --in-board--.

Col. 6, line 56, "putput" should be --output--;
        line 67, ";and" should be --; and--.

Col. 7, line 3, "selects" should be --select--.

Signed and Sealed this

Fifteenth Day of November, 1988

*Attest:*

DONALD J. QUIGG

*Attesting Officer*     *Commissioner of Patents and Trademarks*